United States Patent Office 2,846,432
Patented Aug. 5, 1958

2,846,432

HETEROCYCLIC DERIVATIVES OF 20-AMINO-METHYL-5-PREGNEN-3-OL

Leonard N. Nysted, Highland Park, Ill., assignor to G. D. Searle & Co., Chicago, Ill., a corporation of Delaware No Drawing. Application October 31, 1957
Serial No. 693,514

4 Claims. (Cl. 260—239.5)

The present invention relates to certain heterocyclic derivatives of steroids and, more particularly, to heterocyclic derivatives of 20-aminomethyl-5-pregnen-3-ol which can be represented by the general structural formula

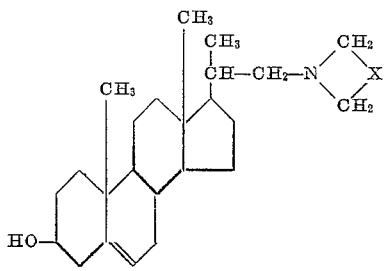

wherein X is a member of the class consisting of

—CH$_2$CH$_2$—, —CH$_2$—CH$_2$—CH$_2$— and

—CH$_2$O—CH$_2$— radicals.

The compounds of this application can be conveniently prepared by the reduction of the corresponding 3-hydroxy-5-pregnene-20-carboxamides described and claimed in my copending application Serial No. 488,713, filed February 16, 1955, which will issue as United States Patent No. 2,813,094 on November 12, 1957, of which the present application is a continuation-in-part.

The compounds of this invention are valuable pharmaceutical agents. They have a digitalis-like stimulant action on the heart and have a hypotensive effect. Further, they antagonize the sodium-retaining activity of the mineralocorticoid hormone aldosterone.

These bases form salts with a variety of inorganic and strong organic acids including sulfuric, phosphoric, hydrochloric, hydrobromic, sulfamic, citric, maleic, malic, ascorbic, and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The invention will appear more fully from a consideration of the following illustrative examples in which quantities are given in parts by weight.

Example 1

A mixture of 25 parts of N-(3β-acetoxy-5-pregnen-20α-ylcarbonyl)piperidine and 25 parts of lithium aluminum hydride in 5500 parts of anhydrous ether is refluxed for 4 hours and then refluxed for an additional hour with 250 parts of ethyl acetate. The reaction mixture is then treated with water and the ether solution is separated, washed with water, dried over anhydrous calcium sulfate and filtered. A stream of anhydrous hydrogen chloride is passed through the ether solution and the resulting precipitate is collected on a filter, washed with ether and recrystallized from methanol. The resulting hydrochloride of 20α-piperidinomethyl-5-pregnen-3β-ol melts with decomposition at about 270–300° C.

Example 2

A mixture of 5 parts of N-(3β-acetoxy-5-pregnen-20α-ylcarbonxyl)pyrrolidine and 5 parts of lithium aluminum hydride in 1100 parts of an anhydrous ether is refluxed for 3 hours and then refluxed for an hour with 50 parts of ethyl acetate. After addition of water the mixture is extracted with ether and the ether solution is washed with water, dried over anhydrous calcium sulfate and filtered. Dry hydrogen chloride is bubbled into the ether solution and the resulting precipitate is collected on a filter, washed with ether and recrystallized from methanol to yield the high melting crystalline hydrochloride of 20α-pyrrolidinomethyl-5-pregnen-3β-ol. The infrared absorption spectrum shows maxima at about 2.7 and 6.1 microns.

Example 3

A mixture of 2 parts of N-(3β-acetoxy-5-pregnen-20α-ylcarbonyl)morpholine and 2 parts of lithium aluminum hydride in 220 parts of ether is refluxed for 3 hours and then heated for an hour with 20 parts of ethyl acetate. It is then poured into water and extracted with ether. The ether solution is washed with water, dried over anhydrous calcium sulfate and filtered. Dry hydrogen chloride is bubbled into the ether solution until precipitation is completed. The precipitate is collected on a filter, washed with ether and recrystallized from methanol to yield the hydrochloride of 20α-morpholinomethyl-5-pregnen-3β-ol which melts at about 285–295° C. with decomposition.

What is claimed is:
1. A compound of the formula

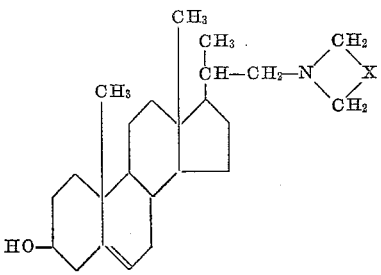

wherein X is a member of the class consisting of

—CH$_2$CH$_2$—, —CH$_2$—CH$_2$—CH$_2$— and

—CH$_2$O—CH$_2$— radicals.
2. 20α-pyrrolidinomethyl-5-pregnen-3β-ol.
3. 20α-piperidinomethyl-5-pregnen-3β-ol.
4. 20α-morpholinomethyl-5-pregnen-3β-ol.

References Cited in the file of this patent

UNITED STATES PATENTS 2,813,094    Nysted _____ Nov. 12, 1957